United States Patent Office
3,733,193
Patented May 15, 1973

3,733,193
RECOVERY OF VANADIUM FROM TITANIFEROUS IRON ORES
Joseph S. Fox, Lewiston, N.Y., and William H. Dresher, Upper Saddle River, N.J., assignors to Union Carbide Corporation, New York, N.Y.
Filed July 22, 1970, Ser. No. 57,091
Int. Cl. C22b 55/00
U.S. Cl. 75—1    4 Claims

ABSTRACT OF THE DISCLOSURE

A process for salt roasting a vanadium-containing titaniferous iron ore having at least a few percent of a silicious material calculated as $SiO_2$, comprising the addition of an aluminum bearing material to the ore, prior to roasting, in an amount ranging between about 2% and about 15% based on the weight of the ore, and wherein the roasting is carried out at a temperature not in excess of about 1350° C. for a time period between about ½ and about 2 hours so as to extract at least 70% of the vanadium values contained in said ore.

FIELD OF THE INVENTION

Figure 1:
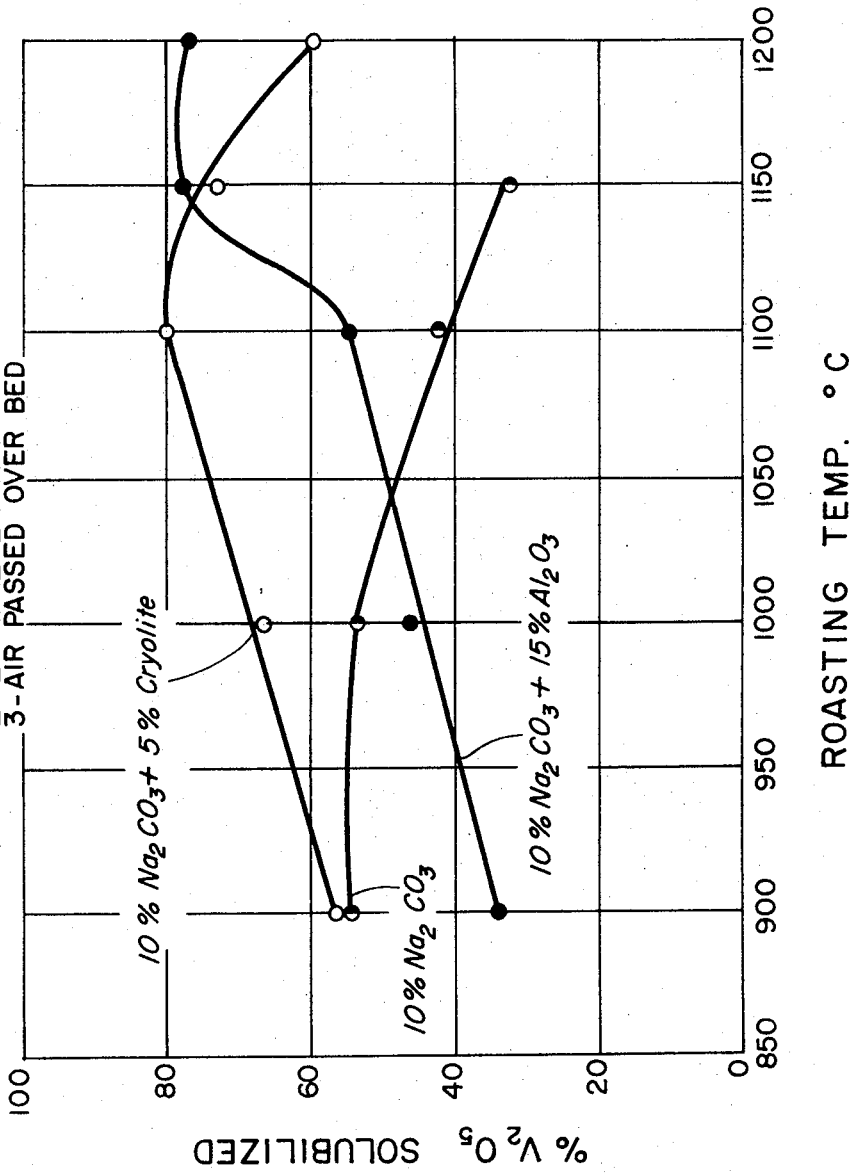

This invention relates, in general, to a process for recovering vanadium from titaniferous iron ores, and more particularly, to a method by which insoluble vanadium values contained in such ores are transformed into a water-soluble form, thus rendering the vanadium values capable of being leached from the ore with water.

DESCRIPTION OF THE PRIOR ART

Vanadium is commonly extracted from its principle ores and by-product sources, such as magnetic concentrates, by roasting the ore in the presence of sodium salts, and then leaching the calcines with water. The roasting operation transforms the insoluble vanadium values into water soluble sodium compounds. The soluble vanadium values which have been leached from the roasted ore are thereafter precipitated, separated from the solution as an insoluble vanadium compound and finally reduced to ferrovanadium or other vanadium alloys Various sodium salts have been used for roasting vanadium ore. Sodium chloride, sodium carbonate, sodium sulfate, and mixtures of sodium chloride and carbonate have been suggested by the prior art, the choice appearing to depend upon the particular ore being processed.

After the roasted calcines have been leached with water to extract the soluble vanadium values from the ore, various vanadium compounds such as "red cake," ammonium metavanadate or ammonium hexavanadate can be precipitated from the leach liquor.

The first of these procedures involves the precipitation of vanadium with sulfuric acid in accordance with techniques well known in the art. The efficiency of the precipitation as well as the filterability of the precipitate depends on the presence of both potassium and sodium ions in the leach liquor. Since both potassium and sodium are an integral part of the "red cake" precipitate, it is impossible to prepare a vanadium product by this technique which is free of these impurities. Hence, the red cake process is limited to vanadium for uses where these impurities are tolerable.

The second procedure substitutes ammonium ions for the sodium ions associated with the vanadium in the leach solution, by the addition of a large excess of ammonium hydroxide or anhydrous ammonia of the solution. Ammonium metavanadate is then salted out of the solution by the addition of ammonium chloride or ammonium sulfate. While this procedure leads to a consistently pure product, it has the disadvantages of relatively high reagent cost, as well as a less than desirable vanadium recovery due to the solubility of ammonium metavanadate in water.

The third of the above mentioned procedures consists of adding sufficient ammonium sulfate or chloride to the leach liquor to convert the sodium metavanadate in the solution to ammonium metavanadate. Thereafter, sufficient sulfuric acid is added to lower the pH from the metavanadate region (pH 6.5 to 9.5) to the hexavanadate region (pH 2.3 to 6.5). This method has the advantages of flow reagent consumption, relatively complete precipitation, a readily filterable product, and the ability to produce an alkali metal-free product.

After the sodium bearing mother liquor is washed from the vanadium-containing filter cake, the cake is heated to a temperature of between 200–300° C. in order to decompose the ammonium vanadate compound to the oxide and to volatilize the ammonia or, in the case of red cake, to drive off water. Thereafter, the temperature is increased to about 800–900° C. to melt the vanadium pentoxide which remains. The molten oxide is then either cast to a convenient shape for shipping and/or further processing.

Although the prior art roasting processes are suitable for most vanadium ores, it has been found that the above-mentioned sodium salts are not adequate when used alone for certain magnetite ores and concentrates, since only a very low degree of vanadium solubilization is obtained by roasting the ore. To achieve a commercially feasible process, it is essential that a maximum amount of the vanadium values present in the ore be solubilized and thus amenable to leaching. The actual amount of vanadium which must be recovered from the ore is dependent upon the economics of the individual project, however, 70 to 85 percent is usually desired in normal practice. The low vanadium content of most titaniferous iron ore deposits makes it important that low cost methods be developed in order to recover economically the maximum amount of vanadium from these ores.

SUMMARY OF THE INVENTION

One aspect of this invention has been the discovery of the cause of the frequent difficulty experienced in attempting to solubilize, by salt roasting, the vanadium values in titaniferous iron ore. It has been found that the insolubility is caused by the presence of silicious materials, such silicious minerals being garnet, pyroxene, and feldspar minerals, either in the ore itself or used in the refractory lining of the roasting furnace. The roasting operation carried out in a heated zone is very sensitive to the presence of silicious materials; hence, even small amounts, in the order of a few percent (calculated as $SiO_2$) percent during roasting have an adverse effect upon the solubilization of the vanadium and consequently on the ultimate recovery of vanadium from the ore. For this reason a furnace lining material should be carefully checked for its possibly reaction with the ore-salt mixture. Refractory compositions having a large amount of free silica should be avoided. The most desirable refractories for this use are the basic bricks manufactured from chrome ore and magnesite. Silicious phases can be present in the brick provided the silica contained in them is tied up by alumina such as in mullite. Magnesium silicates and calcium silicates should be avoided.

Another aspect of this invention relates to the means by which the above cause of insolubility may be remedied. In order to increase solubilization and consequent recovery of vanadium, it has been found necessary either to remove substantially all silicious minerals from the ore by phsical or electromagnetic means prior to roasting, or where this is not feasible, the adverse effect of silica or other silicious material may be overcome by the addition of certain additives to the roast. The means whereby silicate minerals can be removed prior to salt roasting the ore for vanadium recovery are similar to those used for the processing of titaniferous iron ores for ilmenite recovery and magnetite recovery. Magnetic concentration is common for removing magnetite, and gravity methods are common for separating titanium minerals from silica and silicates.

One means by which the silicious minerals can be separated from the ore is by electromagnetic means. Ores in which the vanadium-bearing iron mineral is either magnetite or maghemite are suitable for magnetic separation. These minerals are ferromagnetic and are attracted to a magnet. Other ores, in which the iron minerals have suffered extensive weathering and therefore have lost their ferromagnetic properties, are not as amenable to magnetic processing. Basically, the magnetic separation technique requires that the silicious minerals be liberated from the vanadium-bearing iron minerals by crushing and grinding prior to the time that the minerals are to be separated. The efficiency of the separation process itself largely depends upon the completeness of the liberation operation. The particle size to which the ore must be ground in order to cause mineral liberation is unique to every ore deposit. These particle sizes may range about 10 mesh U.S. Standard and smaller. Generally the magnetic separation can be accomplished either wet or dry. Wet processing has the advantage of high operating capacity and efficient separation. A number of commercial magnetic separators are available for this purpose. The major variables involved are the particle size of the ore and the intensity or field strength of the magnet equipment used.

Another means by which the silicious material can be separated from the ore is by gravity means. This type of separation is possible due to the difference in the specific gravities of the silicious material and the vanadium bearing ore. There are numerous conventional means by which such a separation can be accomplished. Suitable methods include hydrocycloning, tabling, and jigging. As with electromagnetic separation, gravity separation is largely dependent upon the ability of the minerals present to be liberated during the crushing and grinding operations. The particle size range applicable to gravity separation is similar to that for magnetic separation. Highly weathered ores tend to be less amenable to gravity separation that are unweathered ores. This is due to the creation of low density, fine particles of hematite or goethite both of which are difficult to separate from silicious minerals by gravity methods.

Although electromagnetic or gravity separation of silicious material from titaniferous iron ore is feasible when the ore crystal phase is of sufficiently large size, it is not possible to use the above techniques where the ore phase is of submicroscopic size or if the ore has suffered extensive weathering. Under the latter circumstances, a different method must be used since the gravitational and electromagnetic techniques will not achieve an adequate separation of the silicious minerals from the ore.

Another aspect of this invention relates to a method according to which the siliceous minerals in the ore need not be removed prior to roasting, but wherein the adverse effects of the silicious minerals are overcome by the addition to the ore, prior to salt roasting thereof, of an additive. It has been found that a minor amount (in the neighborhood of between about 2 and about 15 percent by weight based on the weight of the ore) of aluminum oxide, $Al_2O_3$, or an aluminum bearing material such as cryolite ($3NaF \cdot AlF_3$) will accomplish the desired results. The $Al_2O_3$ may be in the pure form, i.e., alumina, or in the form of less pure grades of $Al_2O_3$ such as aluminum in ore, e.g., bauxite. FIG. 1 illustrates the advantages of adding such aluminous compounds to a roast mixture which was processed from magnetic concentrates of titaniferous magnetites from Tahawas, N.Y. Identical samples of Tahawas magnetic concentrates were prepared and then roast tests were conducted with and without $Al_2O_3$ and cryolite as additives. The results show that by adding these aluminous compounds, the percent of vanadium solubilized was greatly increased.

While not wishing to be limited to any theories of operation, it is believed that the detrimental effect which siliceous materials have on the solubility of vanadium ore are due to the formation of low melting sodium iron silicates, such as acmite, $Na_2O \cdot Fe_2O_3 \cdot 4SiO_2$ which retain the vanadium oxides in water-insoluble solid solution.

The addition of an alumina-containing compound is believed to form sodium aluminum silicates and sodium aluminum-iron silicates which have higher melting points than the temperature used in the roasting operation. These compounds then do not incorporate as much of the vanadium from the ore into their structures as do the lower melting sodium iron silicates.

EXAMPLES

In each of the test results reported in the examples to follow the roasting treatment consisted of the following procedure: To 100 grams of magnetite ore there was added the desired amount of the salt or additive or both and mixed well in a large mortar. The contents of the mortar were trensferred to a shallow Inconel-X tray which was then placed in a Hoskins muffle furnace set at the desired temperature. This temperature was held constant within ±15° C. The optimum temperature necessary to convert the vanadium in the ore to a soluble sodium vanadate is largely dependent upon the particular ore being processed. The general range of temperatures required for titaniferous iron ores falls between about 900° C. and about 1350° C. The application of this invention helps to make the temperature variable less critical since without silicate mineral removal or alumina addition, the vanadium recovery tends to fall off after an optimum temperature is reached. In addition, since titaniferous iron ores contain reduced iron oxides, an excess of air is required during the roasting in order to oxidize the iron to the +3 valence state and the vanadium to the +5 valence state. An excess of air was therefore allowed to pass over the material during the entire roasting period. Consequently, the retention time required for roasting is largely dependent upon the ore itself and the equipment in which the roasting operation is performed. Generally the retention time ranges between about ½ and about 2 hours. After heating for the desired length of time, the tray with its contents was removed from the furnace and cooled in air.

To leach the roasted calcines, the following procedure was used in each instance: The cooled roasted calcines were ground to pass through a 20 mesh U.S. Standard screen and then placed in a conventional laboratory three neck flask provided with a stirring paddle, thermometer, condenser and heating and cooling jacket. 400 millileters of water were then added to the flask and leaching continued for one hour at 80° C. After leaching the hot mixture was filtered through a Buchner funnel, and the residue washed out with about 200 ml. of water. The total filtrate (original filtrate combined with washings) was measured and analyzed for vanadium content which was calculated as $V_2O_5$. The results obtained and conditions used for each sample are reported in the examples below.

EXAMPLE 1

Figure 2:
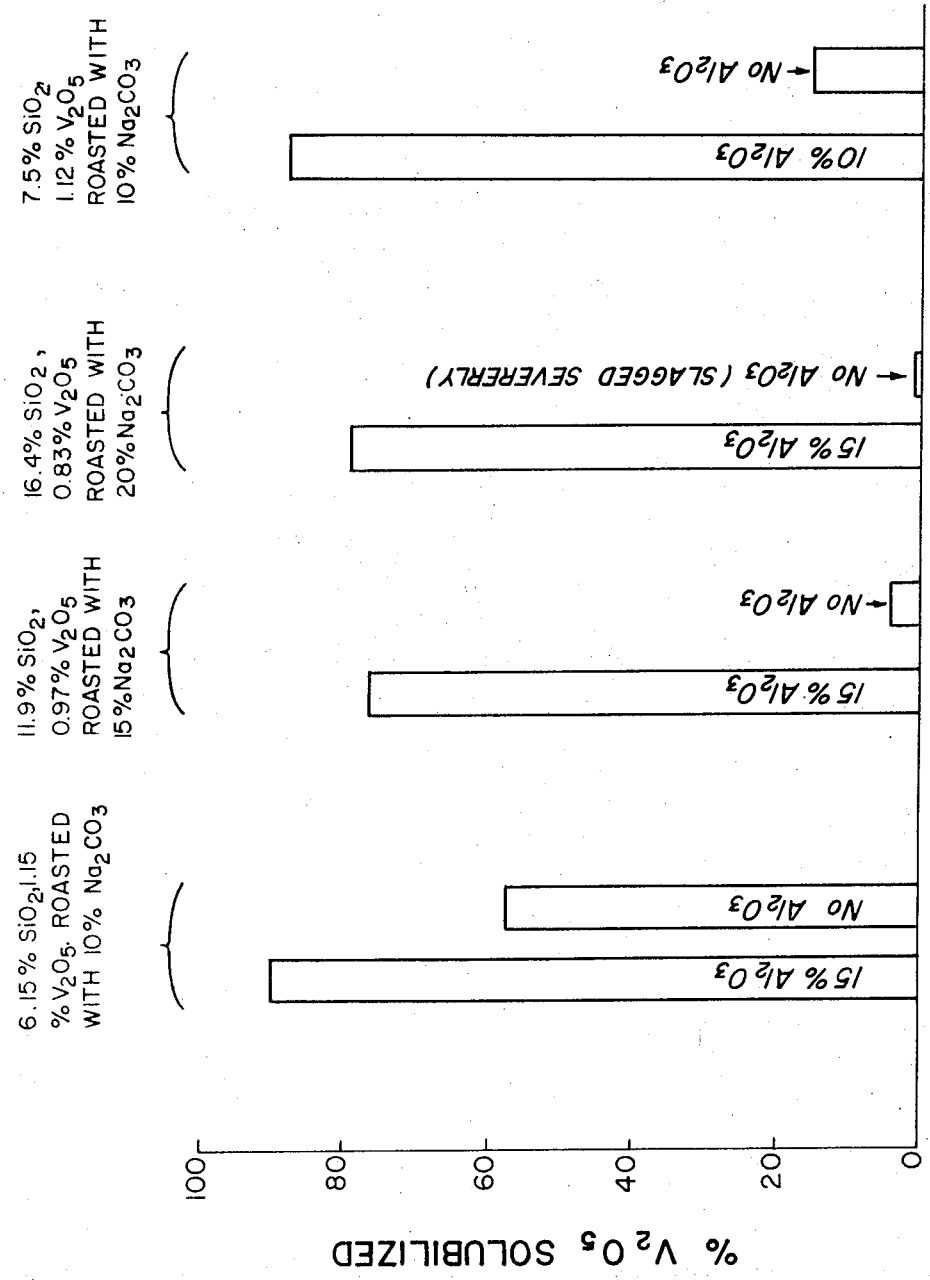

A series of tests were made on several samples of titaniferous iron ore containing varying amounts of vanadium. These ore samples were processed as described above with and without the addition of $Al_2O_3$ at 1225° C. with 10 to 20% $Na_2CO_3$ for 2 hours. The results of these tests are presented in FIG. 2 and shows the sensitivity of the vanadium solubilization to $Al_2O_3$ addition and to the $V_2O_5$ content of the ore.

EXAMPLE 2

A second series of tests were performed on a commercially-produced magnetite concentrate. This material resulted from an operation wherein ilmenite and a portion of the silicate minerals present in the ore were separated from the magnetite by a low intensity magnetic separation process for the purpose of producing an ilmenite concentrate for itanium dioxide production. The original ore contained 55.40% $Fe_3O_4$, 16.57% of $TiO_2$, 15.08% $SiO_2$, and 0.39% $V_2O_5$. After the primary magnetic separations, the magnetite concentrate contained 51.4% $Fe_3O_4$, 10.4% $TiO_2$, 3.9% $SiO_2$, and 0.81% $V_2O_5$. This material was ground in a ball mill to the range of 65 to 150 mesh and treated on a conventional separator. During this treatment 52% of the silica was rejected in 10.4% of the total weight. The final product was reduced to a 2.03% $SiO_2$ content and the $V_2O_5$ content increased to 0.9%. Both the original concentrate containing 3,9% $SiO_2$ and the concentrate which had been reduced to 2.03% $SiO_2$ were roasted under similar conditions as described above for comparison purposes. In each case the material was roasted for a retention time of 2 hours at 1150° C. with a salt mixture added to give 10% $Na_2CO_3$ and 5% NaCl. The material containing 3.9% $SiO_2$ only permitted 43% of the contained vadium to be solubilized while the material containing 2.03% $SiO_2$ permitted 75% of the vanadium to be solubilized.

EXAMPLE 3

A second portion of the concentrate containing 3.9% $SiO_2$ was roasted at 1225° C. for 2 hours with a mixture made up to give 10% $Na_2CO_3$ and 5% $Al_2O_3$ as bauxite. The vanadium recovery from this treatment was 72%.

What is claimed is:

1. In a salt roasting process wherein titaniferous iron ore, containing at least a few percent of a silicious material calculated as $SiO_2$, is roasted in the presence of a salt to extract the vanadium values therein, the improvement comprising an addition to the ore, prior to salt roasting, of an aluminum bearing material in an amount ranging between about 2% and about 15% based on the weight of the ore and wherein the roasting is carried out at a temperature not in excess of about 1350° C. for a period of time ranging between about ½ hour and about 2 hours so as to extract at least 70% of the vanadium values in said ore.

2. The process of claim 1 wherein the roasting of the aluminum and ore mixture is carried out in admixture with at least one salt selected from the group consisting of sodium chloride, sodium sulfate and sodium carbonate.

3. The process of claim 1 wherein said aluminum bearing material is selected from the group consisting of aluminum oxide, cryolite and mixtures thereof.

4. The process of claim 3 wherein the roasting of the aluminum and ore mixture is carried out in admixture with at least one salt selected from the group consisting of sodium chloride, sodium sulfate and sodium carbonate.

References Cited

UNITED STATES PATENTS

| | | | |
|---|---|---|---|
| 2,804,384 | 8/1957 | Armant et al. | 75—1 |
| 3,428,427 | 2/1969 | Raicevic | 75—1 X |
| 1,654,820 | 1/1928 | Koenig | 75—84 X |
| 2,390,687 | 12/1945 | Boericke et al. | 23—51 R X |
| 2,822,240 | 2/1958 | Dunn et al. | 23—51 R X |
| 2,903,341 | 9/1959 | Pike | 23—51 R X |
| 2,939,786 | 6/1960 | Ginsberg et al. | 75—84 X |
| 3,320,024 | 5/1967 | Burwell | 23—51 X |
| 3,420,659 | 1/1969 | Rathmann et al. | 75—84 |

FOREIGN PATENTS

| | | | |
|---|---|---|---|
| 523,410 | 4/1956 | Canada | 23—51 R |
| 1,126,057 | 9/1968 | Great Britain | 75—84 |

ALLEN B. CURTIS, Primary Examiner

U.S. Cl. X.R.

75—84